United States Patent
Sheraizin et al.

(10) Patent No.: US 6,744,818 B2
(45) Date of Patent: Jun. 1, 2004

(54) METHOD AND APPARATUS FOR VISUAL PERCEPTION ENCODING

(75) Inventors: Vitaly S. Sheraizin, Mazkeret Batya (IL); Semion M. Sheraizin, Mazkeret Batya (IL)

(73) Assignee: VLS Com Ltd., Rechovot (IL)

( * ) Notice: Subject to any disclaimer, the term of this patent is extended or adjusted under 35 U.S.C. 154(b) by 421 days.

(21) Appl. No.: 09/748,248

(22) Filed: Dec. 27, 2000

(65) Prior Publication Data

US 2002/0122494 A1 Sep. 5, 2002

(51) Int. Cl.[7] .................................................. H04N 7/12
(52) U.S. Cl. .................................................. 375/240.29
(58) Field of Search ............................ 375/240, 240.01, 375/240.16, 240.29; 382/264; 704/229, 500; H04N 7/12

(56) References Cited

U.S. PATENT DOCUMENTS

| | | | |
|---|---|---|---|
| 5,341,442 A | | 8/1994 | Barrett |
| 5,491,519 A | | 2/1996 | Kim |
| 5,537,510 A | * | 7/1996 | Kim ........................ 704/229 |
| 5,586,200 A | | 12/1996 | Devaney et al. |
| 5,613,035 A | * | 3/1997 | Kim ........................ 704/229 |
| 5,627,937 A | * | 5/1997 | Kim ........................ 375/240 |
| 5,774,593 A | | 6/1998 | Zick et al. |
| 5,796,864 A | | 8/1998 | Callahan |
| 5,845,012 A | | 12/1998 | Jung |
| 5,847,766 A | | 12/1998 | Peak |
| 5,870,501 A | | 2/1999 | Kim |
| 6,005,626 A | * | 12/1999 | Ding ..................... 375/240.16 |
| 6,466,912 B1 | * | 10/2002 | Johnston ................. 704/500 |
| 6,473,532 B1 | * | 10/2002 | Sheraizin et al. ........... 382/264 |

OTHER PUBLICATIONS

U.S. patent application Ser. No. 09/524,618, Sheraizin et al., filed Mar. 14, 2000.

Raj Talluri, et al., "A Robust, Scalable, Object–Based Video Compression Technique for Very Low Bit–Rate Coding", IEEE Transaction of Circuit and Systems for Video Technology, vol. 7, No. 1, Feb. 1997.

Awad Kh. Al–Asmari," An Adaptive Hybrid Coding Scheme for HDTV and Digital Video Sequences," IEEE Transactions on Consumer Electronics, vol. 41, No. 3, pp. 926–936, Aug. 1995.

Kwok–Tung Lo & Jian Feng, "Predictive Mean Search Algorithms for Fast VQ Encoding of Images," IEEE Transactions on Consumer Electronics, vol. 41, No. 2, pp. 327–331, May 1995.

James Goel, et al., "Pre–processing for MPEG Compression Using Adaptive Spatial Filtering", IEEE Transactions on Consumer Electronics, vol. 41, No. 3, pp. 687–698, Aug. 1995.

Jian Feng, et al., "Motion Adaptive Classified Vector Quantization for ATM Video Coding", IEEE Transactions on Consumer Electronics, vol. 41, No. 2, pp. 322–326, May 1995.

(List continued on next page.)

*Primary Examiner*—Young Lee
(74) *Attorney, Agent, or Firm*—Eitan, Pearl, Latzer & Cohen Zedek, LLP

(57) ABSTRACT

A video encoding system includes a visual perception estimator, an encoder, a compression dependent threshold estimator and a filter unit. The visual perception estimator estimates a perception threshold for a pixel of a current frame of a videostream. The encoder encodes the current frame. The compression dependent threshold estimator estimates a compression dependent threshold for the pixel at least from the perception threshold and information from the encoder. The filter unit filters the pixel at least according to the compression dependent threshold.

9 Claims, 12 Drawing Sheets

OTHER PUBLICATIONS

Austin Y. Lan, et al., "Scene–Context–Dependent Reference–Frame Placement for MPEG Video Coding," IEEE Transactions on Circuits and Systems for Video Technology, vol. 9, No. 3, pp. 478–489, Apr. 1999.

Kuo–Chin Fan & Kou–Sou Kan, "An Active Scene Analysis–Based Approach for Pseudoconstant Bit–Rate Video Coding", IEEE Transactions on Circuits and Systems for Video Technology, vol. 8, No. 2, pp. 159–170, Apr. 1998.

Takashi Ida & Yoko Sambonsugi, "Image Segmentation and Contour Detection Using Fractal Coding", IEEE Transactions on Circuits and Systems for Video Technology, vol. 8, No. 8, pp. 968–975, Dec. 1998.

Liang Shen & Rangaraj M. Rangayyan, "A Segmentation-–Based Lossless Image Coding Method for High–Resolution Medical Image Compression", IEEE Transactions on Medical Imaging, vol. 16, No. 3, pp. 301–316, Jun. 1997.

Adrian Munteanu, et al., "Wavelet–Based Lossless Compression of Coronary Angiographic Images", IEEE Transactions on Medical Imaging, vol. 18, No. 3, pp. 272–281, Mar. 1999.

Akira Okumura, et al., "Signal Analysis and Compression Performance Evaluation of Pathological Microscopic Images", IEEE Transactions on Medical Imaging, vol. 16, No. 6, pp. 701–710, Dec. 1997.

* cited by examiner

METHOD AND APPARATUS FOR VISUAL PERCEPTION ENCODING

FIELD OF THE INVENTION

The present invention relates generally to processing of video images,

BACKGROUND OF THE INVENTION

There a three types of redundancy in video signals that are related to the picture within the video. These are structural, statistical and perceptual redundancy. Standard compression systems, such as the various forms of MPEG, H-compression, etc., mainly reduce structural and statistical redundancy. U.S. patent application Ser. No. 09/524,618, assigned to the common assignees of the present invention and incorporated herein by reference, attempts to reduce perceptual redundancy independent of whatever other video compression might be used afterward.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
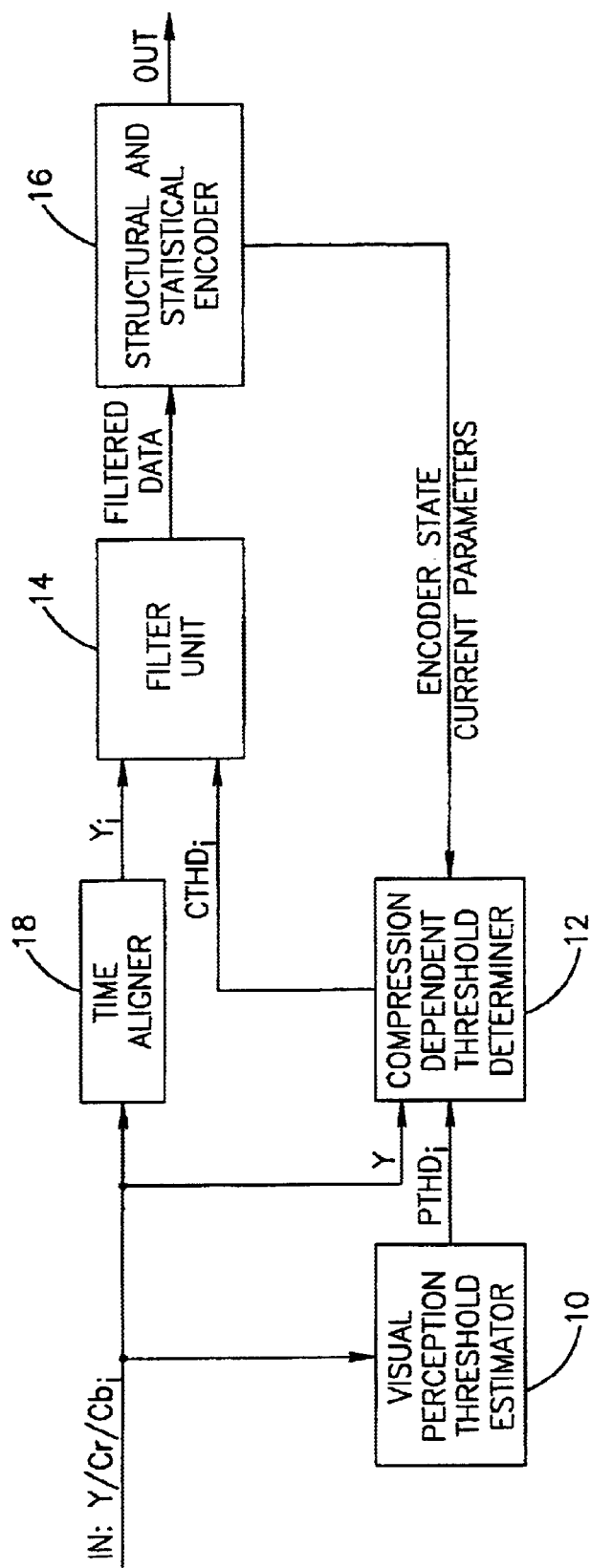
FIG. 1 is a block diagram illustration of a system for visual perception encoding, for use with standard compression encoders, constructive and operative in accordance with a preferred embodiment of the present invention.

Reference is now made to FIG. 1, which illustrates a video encoding system, constructed and operative in accordance with a preferred embodiment of the present invention. The encoding system generally reduces perceptual redundancy in video streams and may comprise a visual perception threshold estimator 10, a compression dependent threshold determiner 12, a filter unit 14 and a structural and statistical encoder 16.

Visual perception threshold estimator 10 may receive an image having luminance Y and red and blue chrominance Cr and Cb signals and may estimate a distinguishing visual perception threshold $PTHD_i$ for each ith pixel of the image. An exemplary estimator 10 is described in U.S. patent application Ser. No. 09/524,618, filed Mar. 14, 2000, assigned to the common assignees of the present invention Ad incorporated herein by reference.

Compression dependent threshold determiner 12 may estimate a distinguishing compression dependent threshold $CTHD_i$ for the ith pixel using the luminance values Y of the image, visual perception threshold $PTHD_i$ and information from encoder 16 about the type of image the current image is as will be described in more detail hereinbelow.

Filter unit 14 filters the ith pixel based on the value of the associated compression dependent threshold $CTHD_i$. It can be a controllable filter set (shown in FIG. 6) or a nonlinear filter (shown in FIGS. 8 and 10). Thus, the kind of filtering to be performed on a pixel depends on whether the luminance value Y of that pixel is above or below the specific distinguishing threshold for that pixel. Since estimator 10 and determiner 12 typically operate with a time delay, the encoding system comprises a time aligner 18 which provides the ith pixel of the image to filter unit 14 when filter unit 14 receives the ith compression dependent threshold $CTHD_i$.

The filtered data is ten provided to encoder 16 for standard encoding. Typically, encoder 16 is a structural and statistical encoder such as any of the MPEG types or an H compression encoder. As is known in the art, MPEG encoders divide the frames of the videostream into "I", "P" and "B" compressed frames where I frames are compressed in full while, for the p and B images, only the differences between the current frame and previous predicted frames are encoded. The tpe of the frame (i.e. was it an 1, P or B frame?) is provided to threshold determiner 12 for use in determining the compression dependent threshold $CTHD_i$. Thus, the type of encoding which encoder 16 performed at least partially affects the type of filtering which filter set 14 will ultimately perform.

Figure 2:
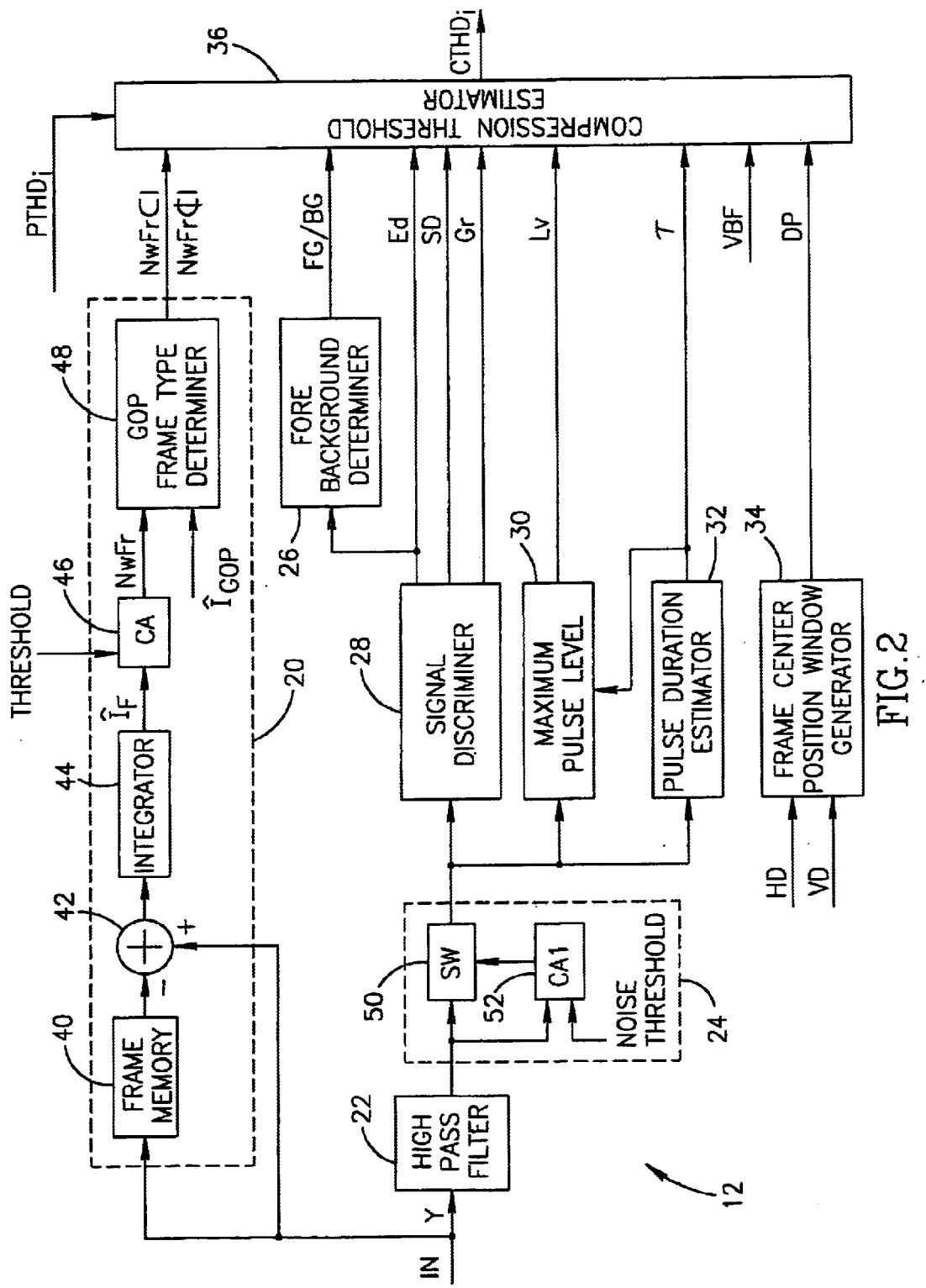
FIG. 2 is a block diagram illustration of a compression dependent threshold determiner, useful in the system of FIG. 1.

Reference is now made to FIG. 2, which generally details the elements of compression dependent threshold determiner 12. Determiner 12 comprises a new frame determiner 20, a high pass filter 22, a noise reducer 24, various parameter determiners 26–34 and a compression threshold estimator 36. The parameters defining the CTHD value comprise at least some of the following parameters:

- whether or not encoder 16 has defined a new frame NwFr as an I frame;
- whether the ith pixel is in the foreground FG or the background BG of the picture;
- whether die ith pixel forms part of an edge Ed around an object in the picture;
- whether or not the ith pixel forms part of a small detail SD;
- whether or not the ith pixel is part of a group Gr type of details (a set of generally periodic details);
- the contrast level Lv of the detail for the ith pixel;
- the duration τ (in transmission time) of a detail within a picture;
- how full a video buffer of encoder 16 is full (a VBF value);
- the distance DP of the ith pixel from the center of the frame; and an initial value $C_0$ for compression dependent threshold CTHD.

The maximum pulse level Lv may be normalized by a maximum luminance signal NLv value, the pulse duration may be normalized by sampling internal $N\tau$ and the detail position DP may be defined by the number of lines and the pixel position within a line. Estimator 36 may then determine compression dependent threshold CTHD, from the normalized parameters and the visual perception threshold $PTHD_i$ as follows:

$$CTHD_i = \left( \frac{PTHD_i + C_E Ed + C_D SD + C_G Gr + C_\tau N\tau +}{C_L NLv + C_F NwFr + C_B F/B + C_P DP} \right) C_V VBF + C_0$$

where $C_E, C_D \ldots C_P$ are weighting coefficients, dependent on the influence of each parameter at CTHD. For MPEG encoders, the following empirical values may be useful:

$$C_E = 0.2$$
$$C_D = 0.8$$
$$C_G = 0.1$$
$$C_L = 0.6$$
$$C_\tau = 0.6$$
$$C_F = \begin{cases} 0.7 & \text{if } NwFr = 1 \\ 0 & \text{otherwise} \end{cases}$$
$$C_B = \begin{cases} 0.5 & \text{if background} \\ 0 & \text{if foreground} \end{cases}$$
$$C_P = 0.5 \left[ \left( \frac{t_H - 0.5H}{0.5H} \right)^2 + \left( \frac{t_V - 0.5V}{0.5V} \right)^2 \right]^{0.5}$$
$$C_V = 1.5$$
$$C_0 = 0.1$$

where $t_H$ and $t_V$ are the position, in time, of the pixel within a line ($t_H$) and a frame ($t_V$) and H and V are the line and frame numbers, respectively, and $C_0$ is the initial CTHD value.

The following other relationships are noted:

$$NLv = \frac{Lv}{L_{max}}$$

$$N\tau = \frac{\tau_{pix}}{\tau}$$

where $L_{max}$ is the maximum value for the luminance signal and $\tau_{pix}$ is the transmission time of one pixel.

New frame determiner 20 may determine whether there is a new frame NwFr and whether or not it has been defined by encoder 16 as an I frame. New frame determiner 20 typically comprises a frame memory 40, a summer 42, an integrator 44, a comparator 46 and a group of pictures (GOP) frame type determiner 48.

Summer 42 finds the differences between the present frame and a previous one stored in frame memory 40. Integrator 44 sums the differences across the frame to produce a change volume $I_f$ indicating the amount change between the neighboring frames. If comparator 46 determines that this change volume $I_f$ is above a certain threshold (such as more than 50% of the maximum amount of pixels in a frame), comparator 46 defines that the present frame is a new frame NwFr.

If comparator 46 indicates that the present frame is a new frame NwFr, GOP frame type determiner 48 determines whether or not encoder 16 defined the frame as an I frame within the current group of pictures and provides this information to estimator 36.

Figure 3:
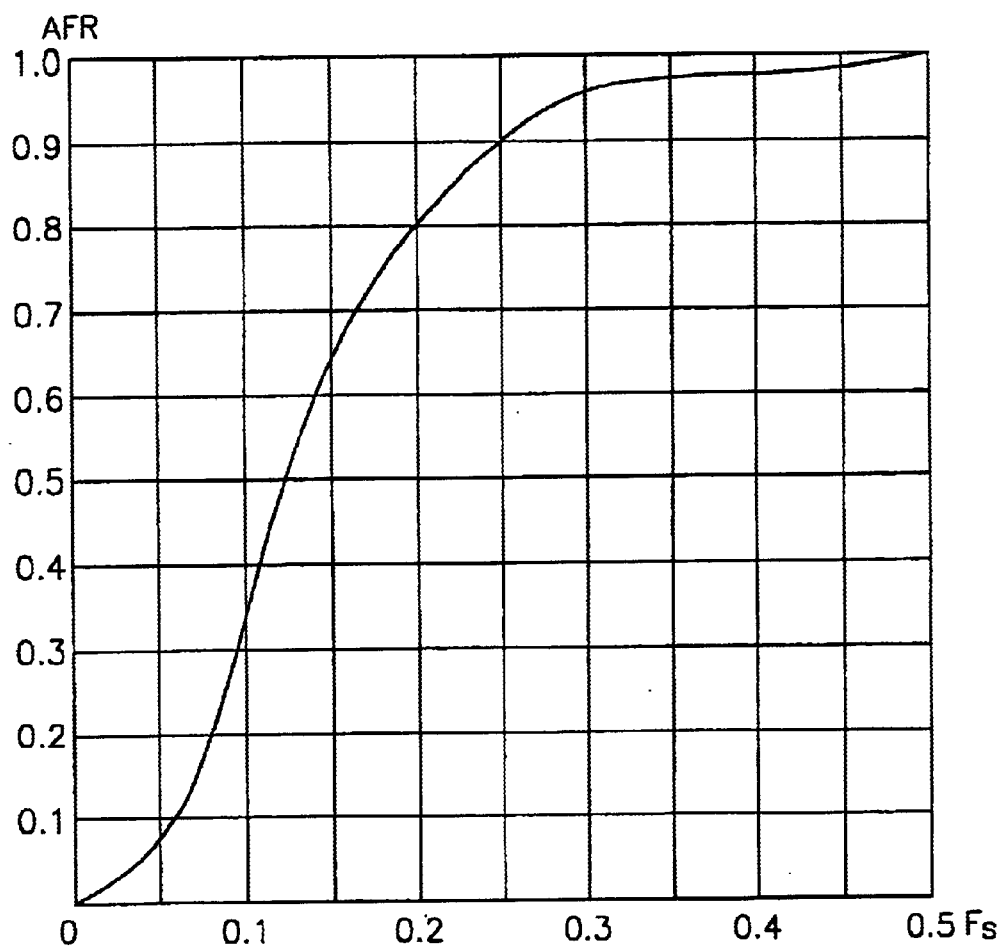
FIG. 3 is a graph of the response of a high pass filter, useful in the determiner of FIG. 2.

High pass filter 22 filters the pixels of the current frame to select only those details of the picture which are of generally short duration such as edges, "single details" formed of only a few pixels and/or details which have a group structure, An exemplary amplitude-frequency response for high pass filter 22 is provided in FIG. 3 to which reference is now briefly made. It is noted that the cutoff frequency is about $0.2 F_s$ where $F_s$ is the sampling frequency of an analog to digital converter (not shown) used to digitize the input signal.

Returning to FIG. 2, noise reducer 24 takes the output of high pass filter 22 and reduces the noise level. Reducer 24 comprises a comparator 52 and a switch 50. Comparator 52 compares the signal level of the filtered signal produced by high pass filter 22 with a noise threshold (typically 3–5 times an average noise level). Switch 50 only passes the filtered signal if its signal level is high enough, as indicated by comparator 52.

Figure 4:
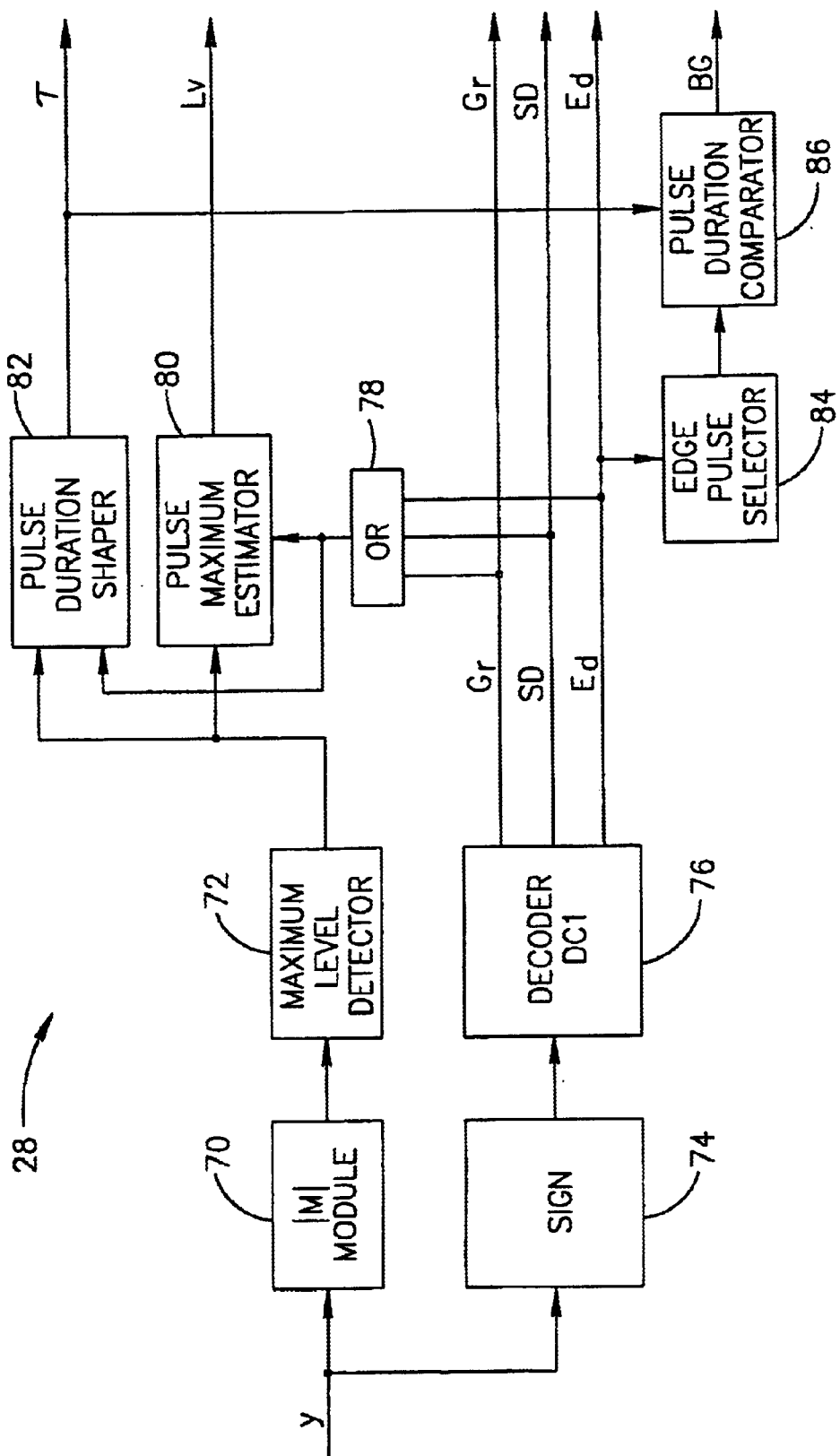
FIG. 4 is a block diagram illustration of a signal discriminator, useful in the determiner of FIG. 2.

A signal discriminator 28 determines which pixels of the filtered and noise reduced signal belong to edges (Ed), single detail (SD) and group of details (Gr). FIG. 4 provides one embodiment of discriminator 28.

A foreground/background determiner 26 uses the edge information to determine if the current pixel is in the foreground or background, where a foreground object has sharp edges and a background object has blurred edges (i.e. ones of long duration).

A pulse duration estimator 32 measures the length of each pulse (which may occur over multiple pixels) to generate the duration T of a detail and a maximum pulse level determiner 30 uses the duration to determine the maximum pulse level Lv within the pulse duration.

A detail position generator 34 determines DP, how close the current pixel is to the center of the frame. To do this, generator 34 receives the frame synchronization, i.e. the horizontal drive (HD) and vertical drive (VD) signals, and the current pixel and uses this information to compare the location of the current pixel to that of the center pixel of the frame FIG. 4 is one embodiment of some of the elements of FIG. 2 showing the operation on the high pass filtered and noise reduced signal, FIG. 5, to which reference is also made, is a timing diagram indicating how the elements of FIG. 4 operate on different types of input signals.

Figure 5:
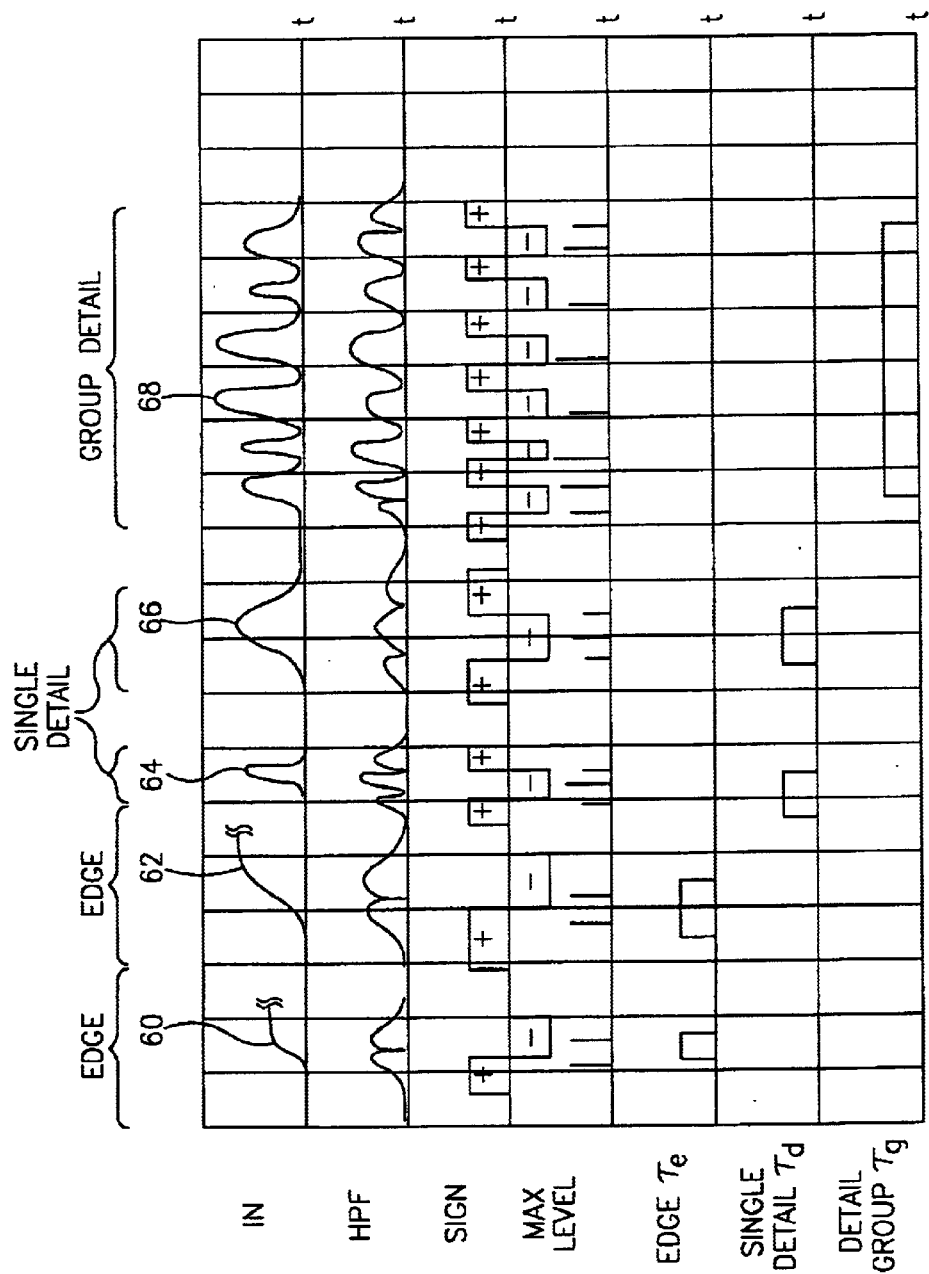
FIG. 5 is a riming diagram illustration, useful in understanding the operation of the determiner of FIG. 2.

The first timing diagram of FIG. 5 shows three types of input signals: two edges 60 and 62, two single details 64 and 66 and a group detail 68. The second timing diagram shows the shape of the signals 60–68 after high pass filtering and noise reduction.

An absolute value module 70 (FIG. 4) finds the absolute value of each pixel and a maximum level detector 72 converts the current maximum level into sign pulses. The output of detector 72 is shown in the fourth dining diagram of FIG. 5. For edges 60 and 62, there are two points where a maximum occurs, as can be seen in the high pass filtered signal of the second ting diagram. The single detail 66 has three points of maximum while the group detail 68 has many of them, relatively regularly spaced.

A sign indicator 74 (FIG. 4) determines the sign (positive or negative) of the high pass filtered and noise reduced signal. The output of indicator 74 is shown in the third timing diagram of FIG. 5. For edges 60 and 62, the sign changes from positive to negative, but after different lengths of time. For single details 64 and 66, the sign changes from positive, to negative to positive, once again after different lengths of time. For group detail 68, the sign continually changes between negative and positive.

A decoder 76 uses the output of sign indicator 74 to determine whether the current pixel or series of pixels is an edge, a single derail or a group detail according to the following table:

TABLE 1

|  | +/− or −/+ | +/−/+ or −/+/− | +/−/+/−/+/ . . . |
|---|---|---|---|
| Edge | yes | no | no |
| Single Detail | no | yes | no |
| Group Detail | no | no | yes |

The output of decoder 76 is shown in the fifth, sixth and seventh timing diagrams for edges 60 and 62, single details 64 and 66, and group detail 68, respectively. It is noted that edge 60 is shorter than edge 62 and single detail 64 is shorter tan single detail 66.

A pulse level maximum estimator 80 receives the edge, single detail and group detail signals of the fifth, sixth and seventh timing diagrams and finds the maximum level Lv of the pulse for the signal which currently has a pulse.

A pulse duration shaper 82 receives the maximum pulse level position signal from detector 72 and the edge, single detail and group detail signals from OR element 78 after decoder 76 and finds the duration X for the signal which currently has a pulse. An edge pulse selector 84 uses the edge signal from decoder 76 and the signal from shaper 82 to select an edge duration pulse when an edge is present. The edge duration pulse selected by selector 84 is provided to a pulse duration comparator 86 which compares the pulse duration x for me current edge to a threshold level indicating the maximum pulse length which indicates a foreground edge. Any pulse length which is longer than the threshold indicates a background pixel and any which is shorter indicates a foreground pixel.

Figure 6:
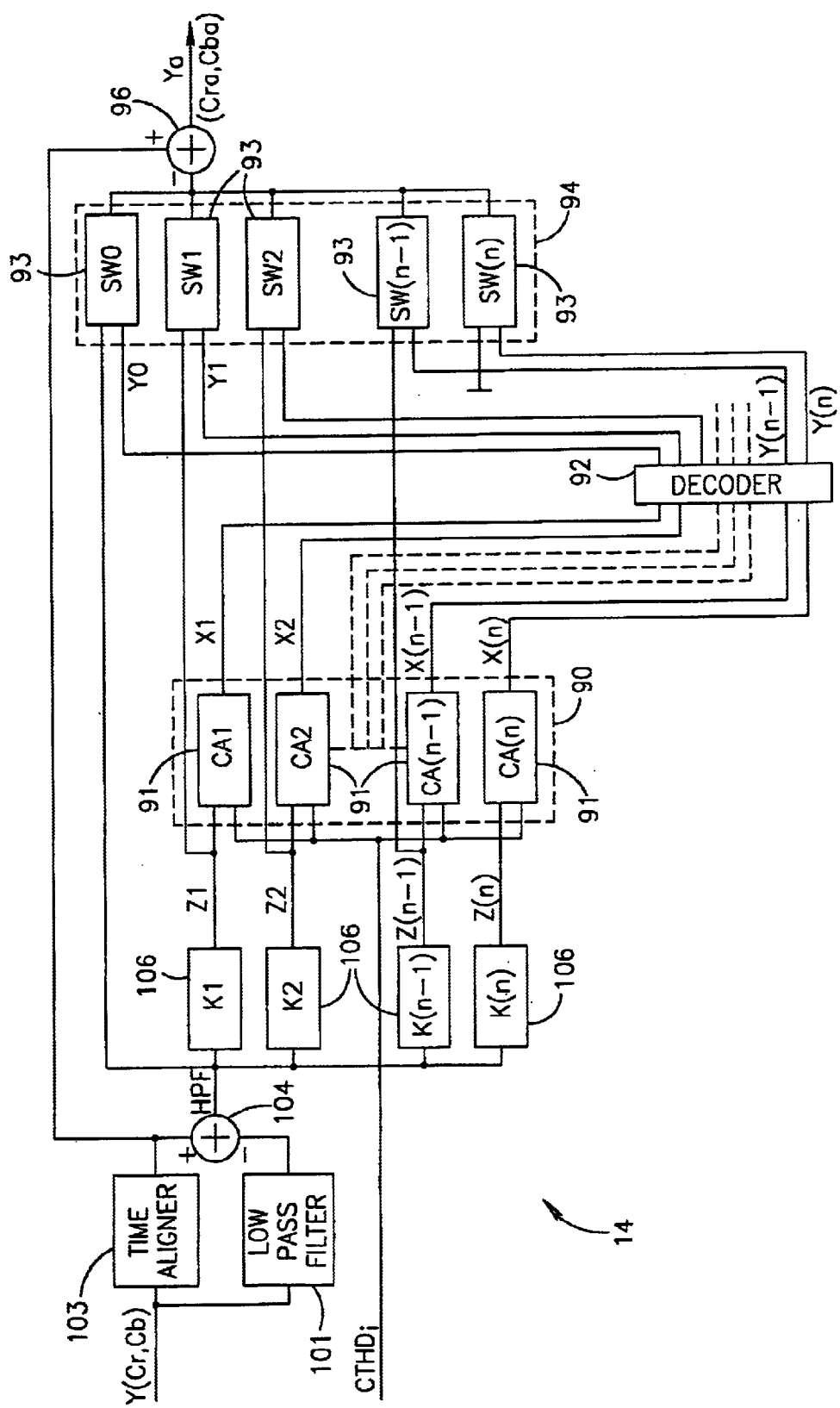
FIG. 6 is a block diagram illustration of a filter unit, useful in the system of FIG. 1.
Figure 7:
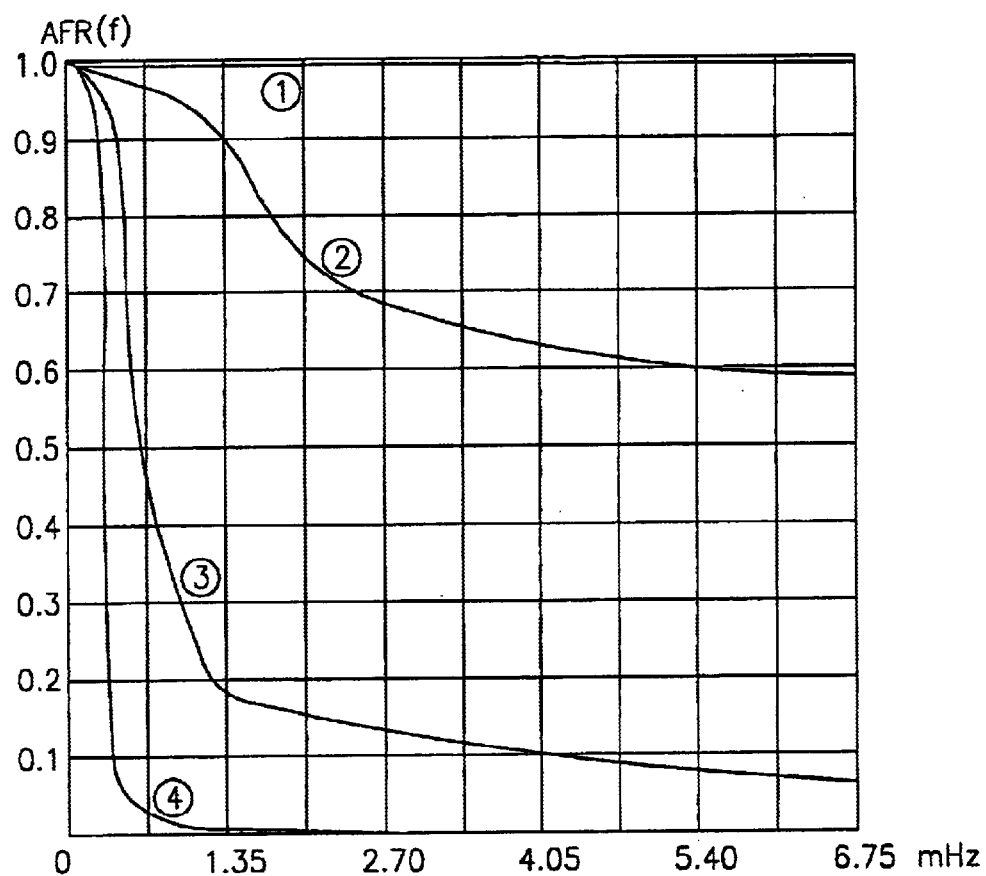
FIG. 7 is a graphical illustration of the frequency response of the filter unit of FIG. 6.

Reference is now made to FIGS. 6 and 7 which, respectively, illustrate the elements of filter unit 14 (FIG. 1) and the shapes of the filters which are utilized therein.

Filter unit 14 is a controllable filter set and typically comprises a series of high pass filters (described in more detail hereinbelow), a set of comparators 90, a decoder 92 and a set of switches 94. Each high pass filter has a different frequency response and has a comparator 91 and a switch 93 associated therewith. The associated comparator 91 compares the level of the filtered data (i.e. filtered pixel) to the compression dependent threshold $CTHD_1$ for the current pixel. Decoder 92 decides which filter output to utilize (based on which filtered data is above the compression dependent threshold $CTHD_i$) and instructs the appropriate switch 93 to pass that filter output for the current pixel.

For each pixel, a summer 96 subtracts the high pass filtered data output from the appropriate switch 93 from the non-filtered data of the frame. Thus, the level of each pixel is changed by the selected high pass filter. It will be appreciated that the operation of controlled filter set 14 is equivalent to a low pass filter optimization for every picture detail in accordance with the value of the compression dependent threshold $CTHD_i$.

The high pass filters are implemented in the embodiment of FIG. 6 from a low pass filter 101, a time aligner 103, a summer 104 and multipliers 106. Summer 104 subtracts a low pass filtered version of the original frame from the original frame and produces thereby a high pass filtered frame. The filtered frame is provided to each multiplier 106 which, in turn, multiplies the signal of the filtered frame, This has the effect of changing the shape of the high pass filter that operates on the frame. Thus, the output of multipliers 106 is a high pass filtered signal. FIG. 7 shows the frequency response of four of the high pass filters, labeled 1–4.

Table 2 provides the function of decoder 92, for eight multipliers K1–K8 whose weight values are 0.125, 0.25, 0.375, 0.5, 0.625, 0.75, 0.875 and 1.0, respectively. Their outputs are signals z1–z8, respectively, the outputs of their respective comparators 91 are signals x1–x8, respectively, and the signals to their associated switches are y1–y8, respectively. The signal y0 instructs a switch sw0 to select the high pass filter output of summer 104.

TABLE 2

| High pass filter | K1 . . . K8 | | | | | | | |
|---|---|---|---|---|---|---|---|---|
| signal level, Zi | X1 | X2 | X3 | X4 | X5 | X6 | X7 | X8 |
| Z8 < CTHD | 0 | 0 | 0 | 0 | 0 | 0 | 0 | 0 |
| Z8 ≥ CTHD | 0 | 0 | 0 | 0 | 0 | 0 | 0 | 1 |
| Z7 < CTHD | | | | | | | | |
| Z7 ≥ CTHD | 0 | 0 | 0 | 0 | 0 | 0 | 1 | 1 |
| Z6 < CTHD | | | | | | | | |
| Z6 ≥ CTHD | 0 | 0 | 0 | 0 | 0 | 1 | 1 | 1 |
| Z5 < CTHD | | | | | | | | |
| Z5 ≥ CTHD | 0 | 0 | 0 | 0 | 1 | 1 | 1 | 1 |
| Z4 < CTHD | | | | | | | | |
| Z4 ≥ CTHD | 0 | 0 | 0 | 1 | 1 | 1 | 1 | 1 |
| Z3 < CTHD | | | | | | | | |
| Z3 ≥ CTHD | 0 | 0 | 1 | 1 | 1 | 1 | 1 | 1 |
| Z2 < CTHD | | | | | | | | |
| Z2 ≥ CTHD | 0 | 1 | 1 | 1 | 1 | 1 | 1 | 1 |
| Z1 < CTHD | | | | | | | | |
| Z1 ≥ CTHD | 1 | 1 | 1 | 1 | 1 | 1 | 1 | 1 |

| High pass filter | K0 . . . K8 | | | | | | | | |
|---|---|---|---|---|---|---|---|---|---|
| signal level, Zi | Y0 | Y1 | Y2 | Y3 | Y4 | Y5 | Y6 | Y7 | Y8 |
| Z8 < CTHD | 0 | 0 | 0 | 0 | 0 | 0 | 0 | 0 | 1 |
| Z8 ≥ CTHD | 0 | 0 | 0 | 0 | 0 | 0 | 0 | 1 | 0 |
| Z7 < CTHD | | | | | | | | | |
| Z7 ≥ CTHD | 0 | 0 | 0 | 0 | 0 | 0 | 1 | 0 | 0 |
| Z6 < CTHD | | | | | | | | | |
| Z6 ≥ CTHD | 0 | 0 | 0 | 0 | 0 | 1 | 0 | 0 | 0 |
| Z5 < CTHD | | | | | | | | | |
| Z5 ≥ CTHD | 0 | 0 | 0 | 0 | 1 | 0 | 0 | 0 | 0 |
| Z4 < CTHD | | | | | | | | | |
| Z4 ≥ CTHD | 0 | 0 | 0 | 1 | 0 | 0 | 0 | 0 | 0 |
| Z3 < CTHD | | | | | | | | | |
| Z3 ≥ CTHD | 0 | 0 | 1 | 0 | 0 | 0 | 0 | 0 | 0 |
| Z2 < CTHD | | | | | | | | | |
| Z2 ≥ CTHD | 0 | 1 | 0 | 0 | 0 | 0 | 0 | 0 | 0 |
| Z1 < CTHD | | | | | | | | | |
| Z1 ≥ CTHD | 1 | 0 | 0 | 0 | 0 | 0 | 0 | 0 | 0 |

Figure 8:
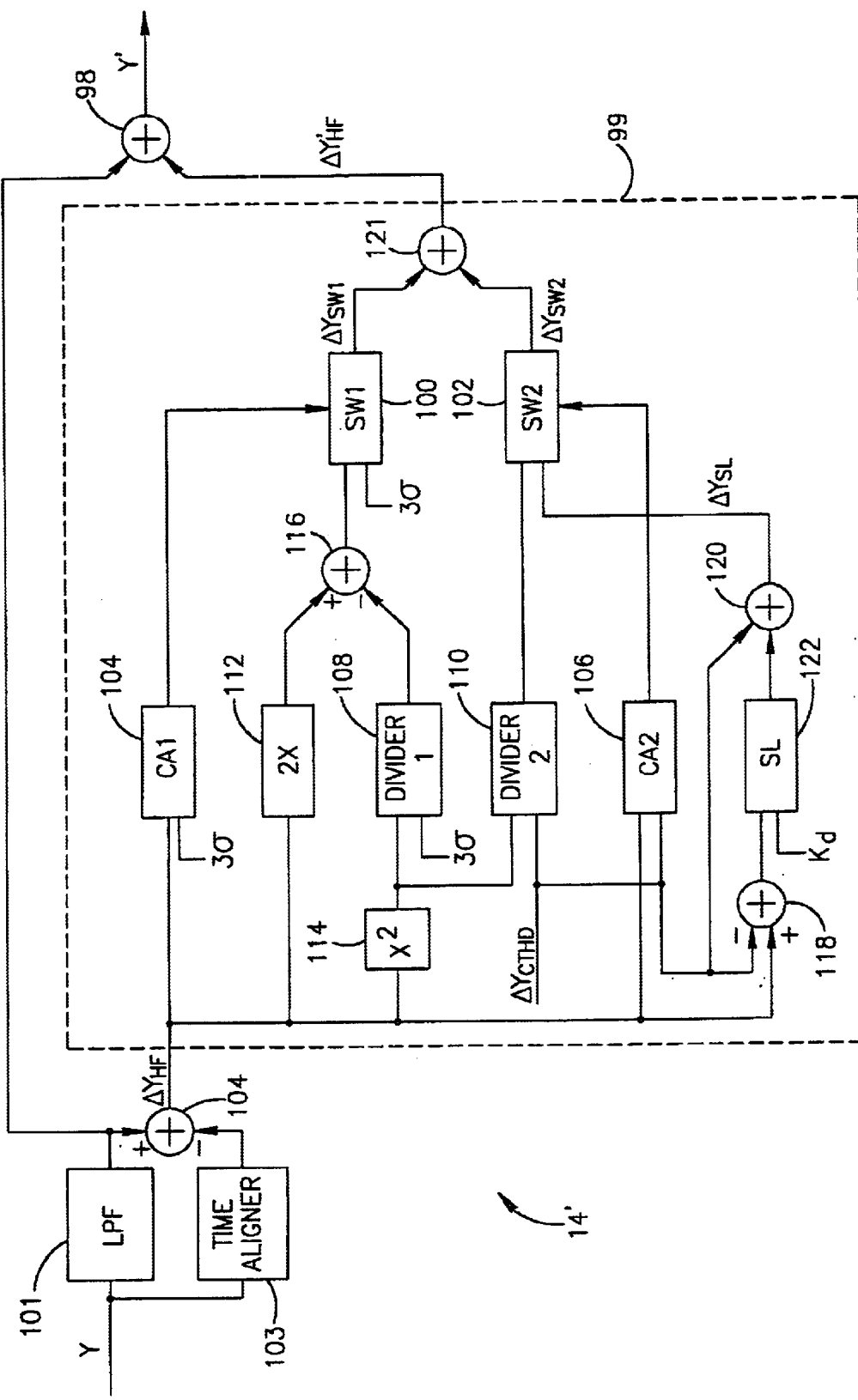
FIG. 8 is a block diagram illustration of an alternative, non-linear filter, useful in the system of FIG. 1.
Figure 9:
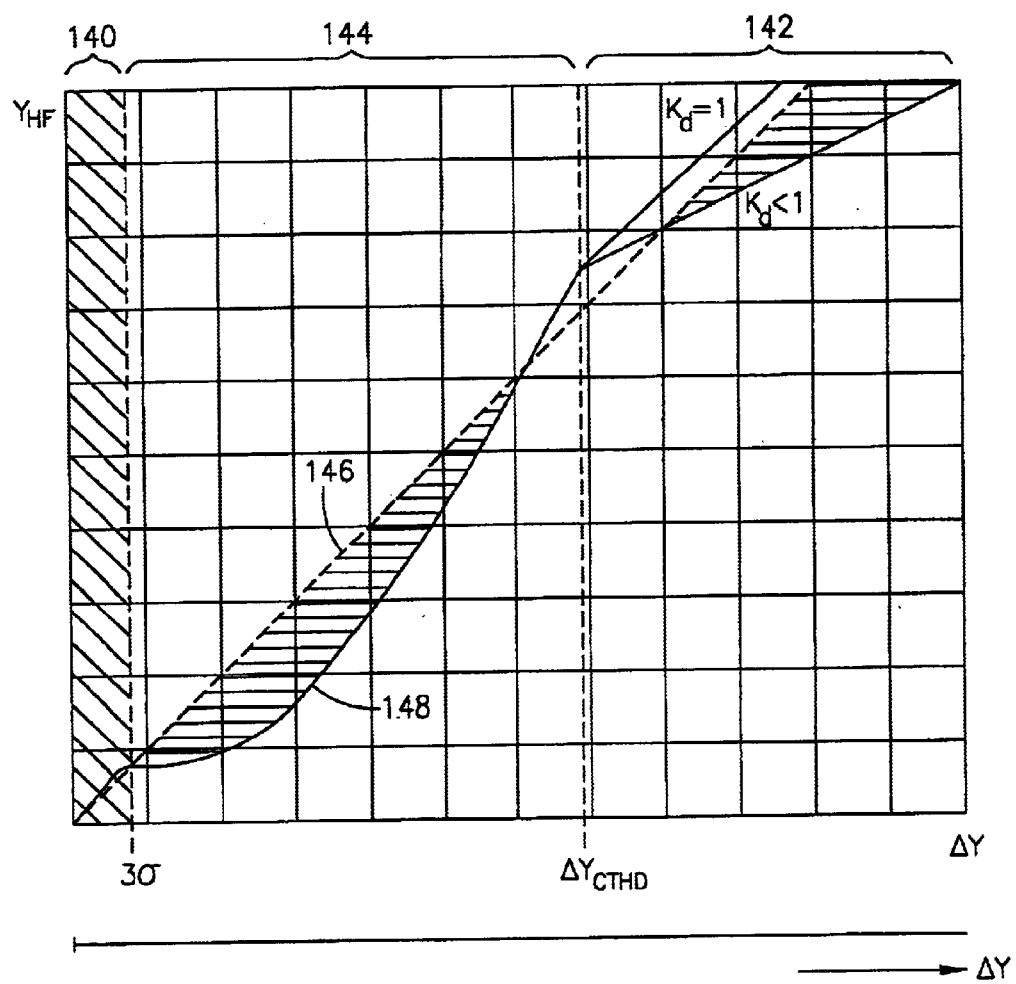
FIG. 9 is a graphical illustration of the frequency response of the filter unit of FIG. 8.

Reference is now made to FIGS. 8 and 9, which present an alternative embodiment of the filter unit, labeled 14'. In this embodiment, the filters of filter unit 14 are non-linear. It is expected that this type of filtering is more suitable for visual perceptual coding because its picture processing is similar to the perceptual process of the human eye which uses detected details (e.g. texture) and distinguished details, As in the previous embodiment, filter unit 14' comprises low pass filter 101, time aligner 103 and summer 104, where summer 104 subtracts a low pass filtered version of the original frame from the original frame and produces thereby a high pass filtered frame $\Delta Y_{HF}$. Typically, the high pass filtered frame comprises the high frequency components that correspond to those details of the frame which have small dimensions. The high pass filtered frame is then filtered by a non-linear filter 99, which produces a processed addition $\Delta Y'_{HF}$ to be added, in a summer 98, to the low pass filtered signal, thereby to produce the filtered signal Y'.

The non-linear filter 99 comprises two switches 100 and 102, two comparators 104 and 106, two dividers 108 and 110, a doubler 112, a squarer 114, four summers 116, 118, 120 and 121 and a variable multiplier 122.

Switch 100 determines the response for texture details and produces a signal $\Delta Y_{SW1}$. Mathematically this is given by:

$$\Delta Y_{SW1} = \begin{cases} 2\Delta Y_{HF} - \frac{\Delta Y^2 HF}{3\sigma}, & \text{if} |\Delta Y_{HF}| < 3\sigma \\ 3\sigma, & \text{otherwise} \end{cases} \quad \text{Equation 1}$$

where σ is the root-mean-squared (RMS) noise level of the input signal.

Comparator 104 compares high pass filtered signal $\Delta Y_{HF}$ to the threshold level 3σ to determine the results of the IF statement in equation 1. The output of comparator 104 indicates to switch 100 to choose either the output of summer 116 (which is the upper calculation of equation 1) or the value of 3σ, as the other input to switch 100.

Summer 116 receives $2\Delta Y_{HF}$ from doubler 112 and $\Delta Y^2 HF/3\sigma$ the combined output of squarer 114 and divider 108 (which also receives the threshold level 3σ) and performs the subtraction, thereby creating the signal to switch 100.

Switch 102, together with summer 121, determines the response for details whose signal level is between the detection and distinction threshold. Switch 102 produces a signal $\Delta Y_{SW2}$. Mathematically this is given by:

$$\Delta Y_{SW2.} = \begin{cases} \frac{\Delta Y_{HF}^2}{\Delta Y_{CTHD}}, & \text{if } |\Delta Y_{HF}| \le \Delta Y_{CTHD} \\ \Delta Y_{CTHD} \Delta Y_{SL}, & \text{otherwise} \end{cases} \quad \text{Equation 2}$$

where $\Delta Y_{CTHD}$ is the signal level that corresponds to the compression threshold CTHD and $\Delta Y_{SL}$ is defined hereinbelow in equation 3.

Comparator 106 compares high pass filtered signal $\Delta Y_{HF}$ to the threshold level $\Delta Y_{CTHD}$ to determine the results of the if statement in equation 2. The output of comparator 106 indicates to switch 102 to choose either the output of divider 110 (which is $\Delta Y^2 HF/\Delta Y_{CTHD}$) or the output of summer 120 (defined by equation 3 hereinbelow).

For distinguished details, the amplitude response is given by:

$$\Delta Y_{SL} = K_d(\Delta Y_{HP} - \Delta Y_{CTHD}) + \Delta Y_{CTHD} \quad \text{Equation 3}$$

where $K_d$ is an externally provided value which varies between 0 and 1.

Summer 118 takes the difference between high pass filtered signal $\Delta Y_{HF}$ and the threshold level $\Delta Y_{CTHD}$ and variable multiplier 122 multiplies the difference by the current value of variable $K_d$, as provided by a user. Summer 120 adds the threshold level $\Delta Y_{CTHD}$ to the signal and provides the result to switch 102.

It is noted that the corrected high pass filtered signal $\Delta Y'_{HF}$ is the sum of the outputs $\Delta Y_{SW1}$ and $\Delta Y_{SW2}$ of the two switches 100 and 102, respectively. Due to the comparisons with the noise level 3σ and the threshold level $\Delta Y_{CTHD}$, the corrected high pass filtered signal $\Delta Y'_{HF}$ generally only contains those details that can be perceived by the human eye.

This is indicated in FIG. 9, which illustrates the amplitude response of the filter 14' versus the change in luminance ΔY. The graph of FIG. 9 has three areas, a detection area 140, defined by the noise level 3σ, a distinction area 142, above the threshold level $\Delta Y_{CTHD}$, and an in-between area 144. The graph of FIG. 9 also shows two curves, a 45° line, labeled 146, which indicates a signal which is not corrected (i.e. the input equals the output) and a solid line 148 indicating the response of filter 14'.

In the detection area 140, the filter 14' makes only a small change over the non-corrected line 146. In in-between area 144, there is a significant difference between non-corrected line 146 and amplitude response 148. This is because, for details that the human eye can detect bat not distinguish, there is little need to encode the pixels of such details in full. In distinction area 142, the slope of amplitude response 148 varies according to the value of the variable $K_d$. Typically, variable $K_d$ is chosen based on a trade-off between the need for compression (in which case variable $K_d$ can be less than 1) and the need to properly reproduce the detail.

Figure 10:
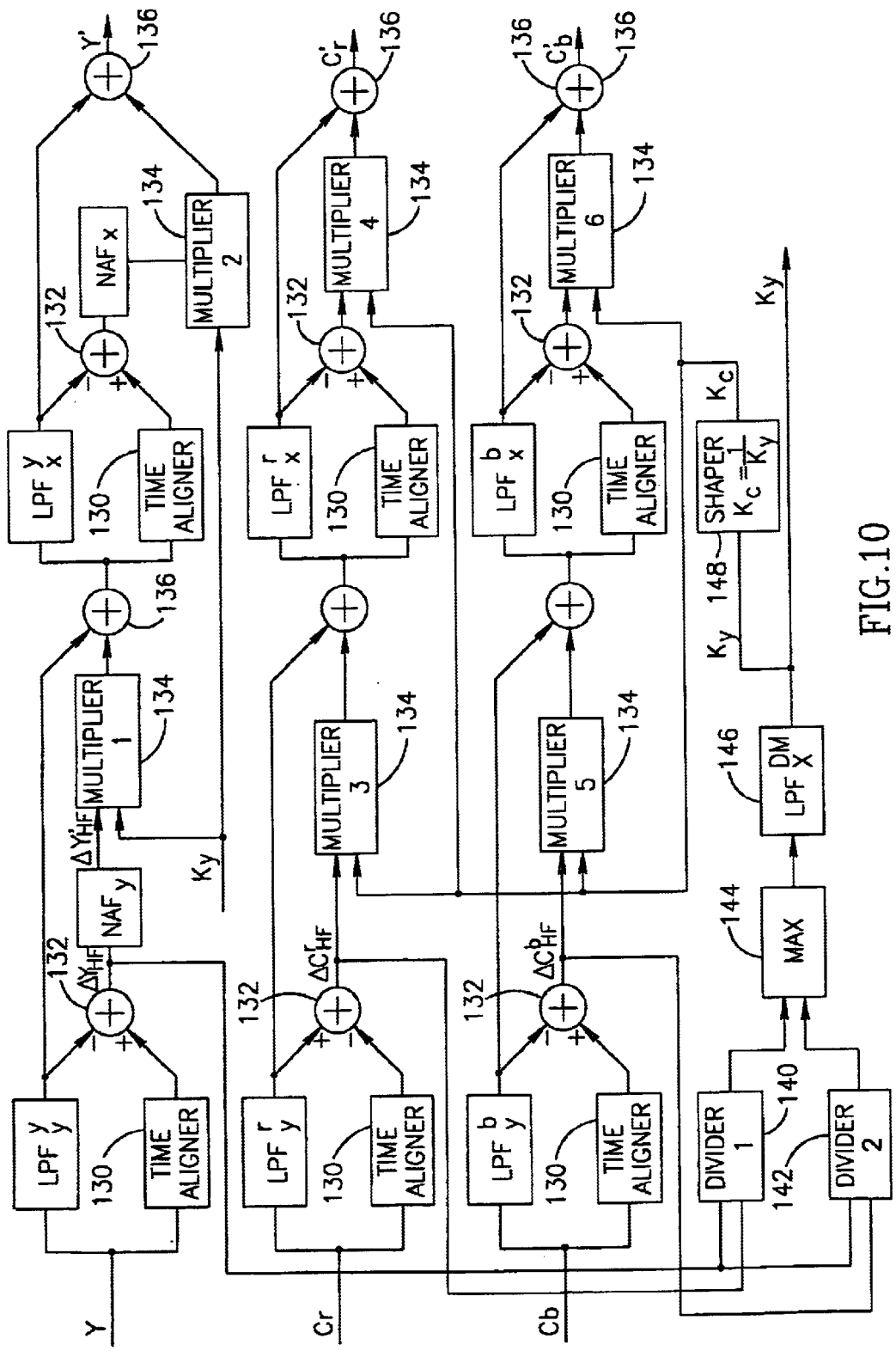
FIG. 10 is a block diagram illustration of an alternative filter unit utilizing the non-linear filter of FIG. 8, useful in the system of FIG. 1.

Reference is now made to FIG. 10 which illustrates visual perceptual coding using the nonlinear filter of FIG. 8 for filtering the Y luminance Y and the two chrominances $C_r$ and $C_b$. Each signal is filtered separately in the X and the Y directions, where the same operations occur for each direction. For each direction and for each signal type, there is a low pass filter ($LPF^Y_y$, $LPF^Y_x$, $LPF^r_y$, $LPF^r_y$, $LPF^b_y$ and $LPF^b_x$) to produce a smoothed signal, a time aligner 130 and a summer 132 to produce the high pass filtered signal ($\Delta Y^Y_{HF}$, $\Delta C^r_{HF}$ and $\Delta C^b_{HF}$) containing the high frequency components, a multiplier 134 to scale the high pass frequency signal (described in more detail hereinbelow) and a summer 136 to add the high frequency elements to the smoothed signal from the low pass filter LPF.

For the luminance signal Y, there is also a non-linear adaptive filter NAF of the type described with respect to FIG. 8, operating on the output of summers 132, to select only the desirable elements of me high frequency signal. The output of the filter NAF is provided to multiplier 134 and the remaining elements are the same as described hereinabove.

Because the ratio of the two chrominances $C_r$ and $C_b$ to the luminance Y must be maintained and because the non-linear filter can affect that ratio, the system of FIG. 10 produces gains $K_Y$ and $K_c$, to correct for any non-linearities introduced. Gain $K_Y$ is used by multipliers 134 in the luminance path and gain K, is used by multipliers 134 in the two chrominance paths.

To produce the gains $K_Y$ and $K_t$, the system of FIG. 10 includes two dividers 140 and 142, a maximum level selector 144, a low pass filter 146 and a shaper 148. Divider 140 divides the luminance high pass filtered signal $\Delta Y^Y_{HF}$ by the red chrominance high pass filtered signal $\Delta C^r_{HF}$ while divider 142 divides the luminance high pass filtered signal $\Delta Y^Y_{HF}$ by the blue chrominance high pass filtered signal $\Delta C^b_{HF}$. Maximum level selector 144 selects the higher value of the outputs of the two dividers 140 and 142 and the output of selector 144 is smoothed by low pass filter 146. The output of low pass filter 146 is the gain $K_Y$. Shaper 148 produces the gain $K_c$ by inverting the level of the gain $K_Y$, thus, $K_c = 1/K_Y$.

Figure 11:
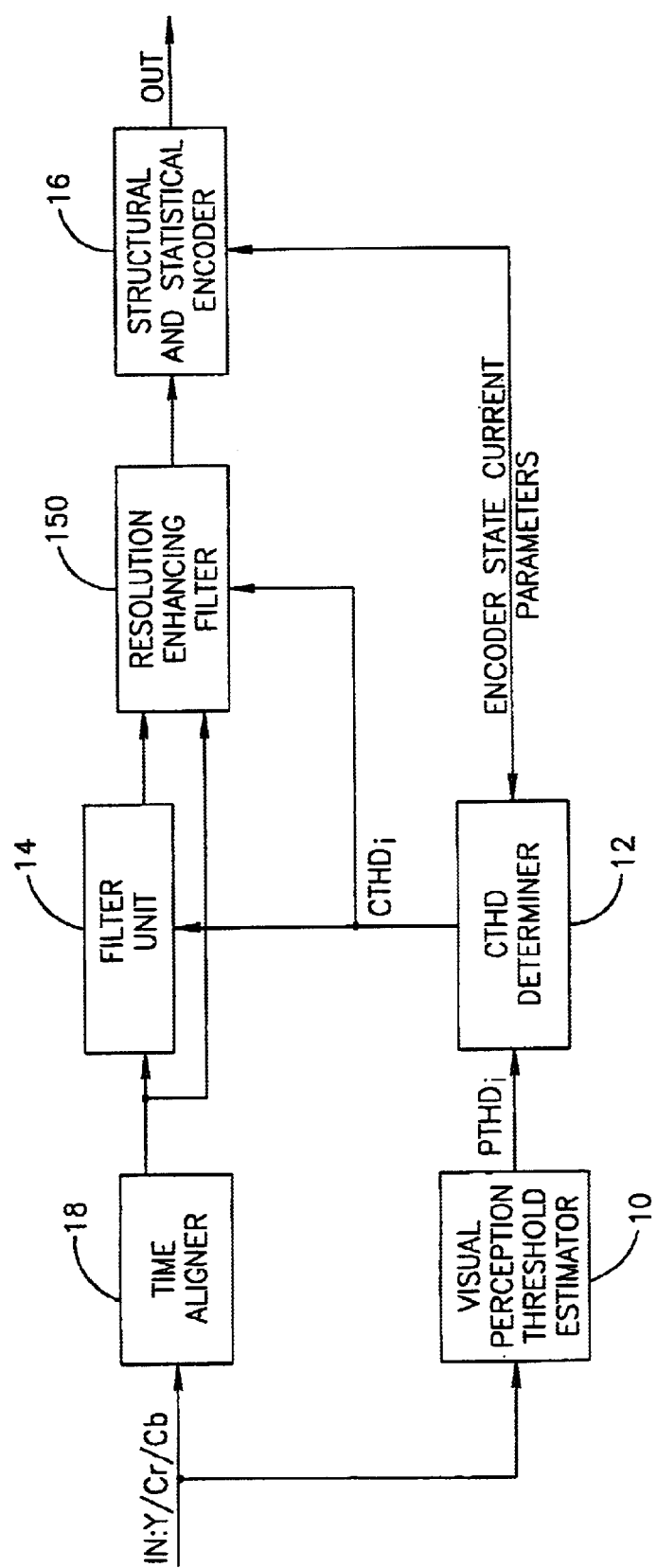
FIG. 11 is a block diagram illustration of a system for visual perception encoding having a resolution enhancing filter, constructive and operative in accordance with an alternative preferred embodiment of the present invention.
Figure 12:
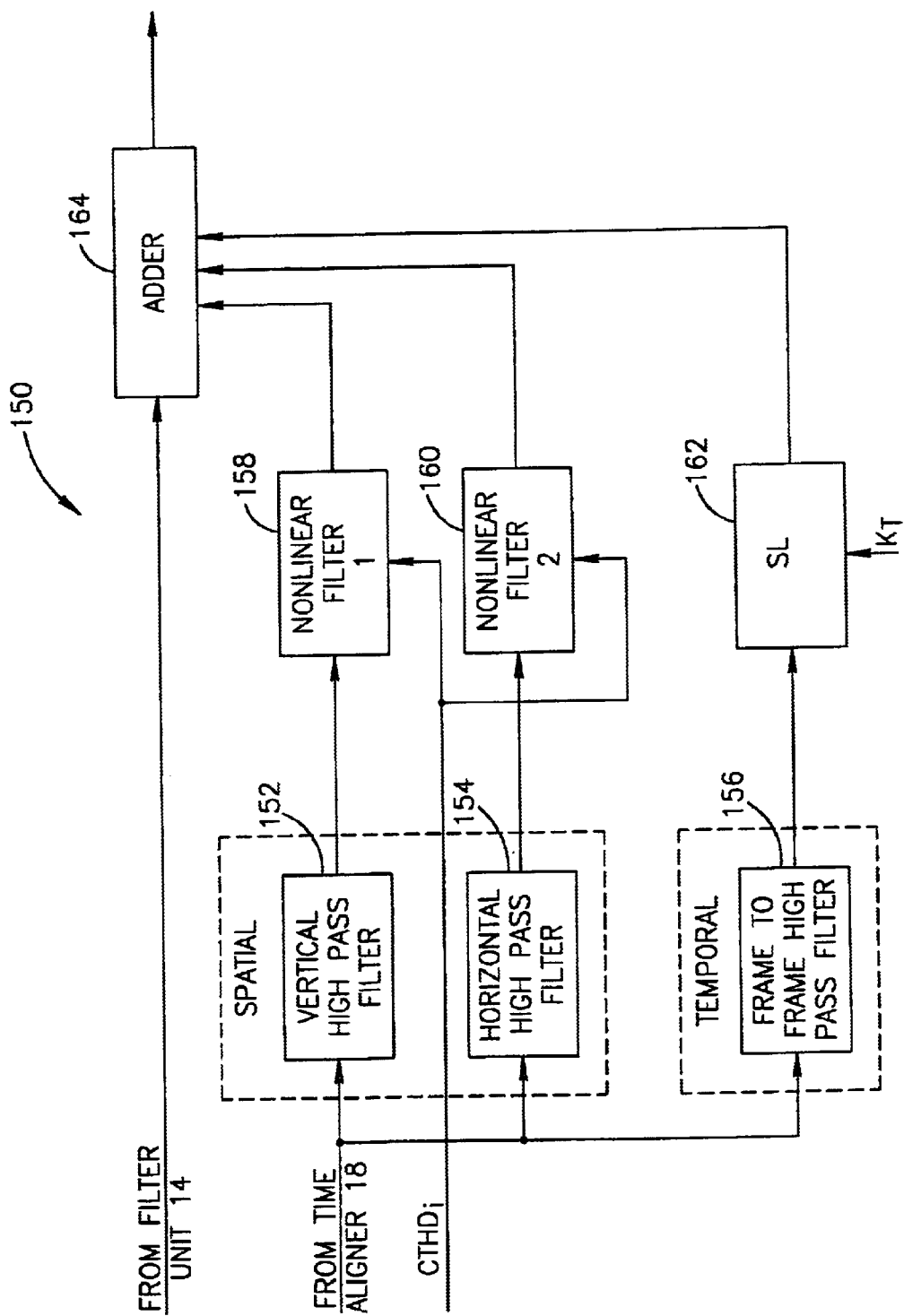
FIG. 12 is a block diagram illustration of the resolution enhancing filter of FIG. 11.

Reference is now made to FIGS. 11 and 12, which illustrate an alternative embodiment of the present invention. FIG. 11 shows the entire system and is similar to that of FIG. 1 with the addition of a resolution enhancing filter 150 which generally enhances the spatial and temporal resolution of the compressed frame produced by filter unit 14 before providing the compressed frame to encoder 16.

Resolution enhancing filter 150 receives the input and output signals of filter unit 14 as well as the compression dependent threshold CTHD. As shown in FIG. 12, filter 150 comprises a vertical high pass filter 152, a horizontal high pass filter 154, a temporal high pass filter 156, two nonlinear filters 158 and 160, a variable multiplier 162 and an adder 164.

Vertical and horizontal high pass filters 152 and 154 have frequency responses similar to that shown in FIG. 3 and operate on the X and Y directions on the input frame from time aligner 18. Temporal filter 156 is a finite impulse response (FIR) filter operating between frames. Exemplary pulse and frequency responses $h_T$ and HT for filter 156 are:

$$h_T = \{-0.25, 0.5, -0.25\}$$

$$H_T(\omega) = \sin^2 0.5\omega T$$

where T is the frame period (typically either 1/25 or 1/30).

Non-linear filters 158 and 160 receive the output signals of high pass filters 152 and 154, respectively, as well as the compression dependent threshold CTHD. Filters 158 and 160 are similar to that shown in FIG. 8 and have responses similar to that shown in FIG. 9.

Variable multiplier 162 receives a variable slope $K_T$ defined as:

$$K_{Ti} = \frac{1}{CTHD_i}$$

and multiplies the output of temporal filter 156 with a linear function having the slope $K_T$.

Adder 164 sums the output of filter unit 14 with the outputs of filters 158 and 160 and of variable multiplier 162 and produces thereby the resolution enhanced, compressed frame.

The methods and apparatus disclosed herein have been described without reference to specific hardware or software. Rather, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

It will be appreciated by persons skilled in the art that the present invention is not limited by what has been particularly shown and described herein above. Rather the scope of the invention is defined by the claims that follow:

What is claimed is:

1. A video encoding system comprising:
   a visual perception estimator adapted to estimate a perception threshold for a pixel of a current frame of a videostream;
   an encoder adapted to encode said current frame;
   a compression dependent threshold estimator adapted to estimate a compression dependent threshold for said pixel at least from said perception threshold and information from said encoder; and
   a filter unit adapted to filter said pixel at least according to said compression dependent threshold.

2. A system according to claim 1 and wherein said compression dependent threshold estimator also estimates at least one parameter from the following group of parameters:
   whether or not a new frame NwFr has been defined by said encoder as an I frame;
   whether an ith pixel is in the foreground FG or the background BG of a picture;
   whether an ith pixel forms part of an edge Ed around an object in the picture;
   whether or not the ith pixel forms part of a single detail SD;
   whether or not the ith pixel is part of a group Gr of generally periodic details;
   the contrast level Lv of the detail for the ith pixel;
   the duration τ of a detail within a picture;
   how full said encoder is; and
   the distance DP of the ith pixel from the center of the frame.

3. A system according to claim 2 and wherein said compression dependent threshold is formed from normalized versions of said parameters and said perception threshold $PTHD_i$ as follows:

$$CTHD_i = \left( \begin{array}{c} PTHD_i + C_E Ed + C_D SD + C_G Gr + C_\tau N\tau + \\ C_L NLv + C_F NwFr + C_B F/B + C_P DP \end{array} \right) C_V VBF + C_0$$

where $C_B, C_D \ldots, C_P$ are weighting coefficients.

4. A system according to claim 1 and wherein said filter unit is a controllable filter set adapted to select a filter for said pixel according to said compression dependent threshold.

5. A system according to claim 1 and wherein said filter unit is a non-linear filter.

6. A system according to claim 5 wherein said non-linear filter comprises:
   a low pass filter;
   a high pass filter whose output is a signal $\Delta Y_{HF}$;
   a first switch SW1 whose output is defined as:

$$\Delta Y_{SW1} = \begin{cases} 2\Delta Y_{HF} - \dfrac{\Delta Y^2 HF}{3\sigma}, & \text{if } |\Delta Y_{HF}| < 3\sigma \\ 3\sigma, & \text{otherwise} \end{cases}$$

where σ is the root-mean-squared (RMS) noise level of the input signal to said filter unit;
   a second switch SW2 whose output is defined as:

$$\Delta Y_{SW2} = \begin{cases} \dfrac{\Delta Y_{HF}^2}{\Delta Y_{CTHD}}, & \text{if } |\Delta Y_{HF}| \le \Delta Y_{CTHD} \\ \Delta Y_{CTHD} \; \Delta Y_{SL}, & \text{otherwise} \end{cases}$$

where $\Delta Y_{CTHD}$ is the signal level that corresponds to the compression dependent threshold CTHD and $\Delta Y_{SL}$ is defined as:

$$\Delta Y_{SL} = K_d (\Delta Y_{HF} - \Delta Y_{CTHD}) + \Delta Y_{CTHD}$$

where $K_d$ is an externally provided value which varies between 0 and 1; and
   a summing unit which sums the output of said first and second switches with the output of said low pass filter.

7. A system according to claim 1 and wherein said filter unit includes at least one nonlinear filter unlit and a chrominance correction unit.

8. A system according to claim 7 and wherein said chrominance correction unit includes means for maintaining the ratio of two chrominances $C_r$ and $C_b$ to luminance Y.

9. A system according to claim 1 and also comprising a resolution enhancing filter which generally enhances the resolution of the output of said filter unit.

* * * * *